Oct. 7, 1969  L. H. AUSTIN  3,470,908
VARIABLE HYDRAULIC CONTROL DEVICE
Filed Oct. 5, 1966  2 Sheets-Sheet 1
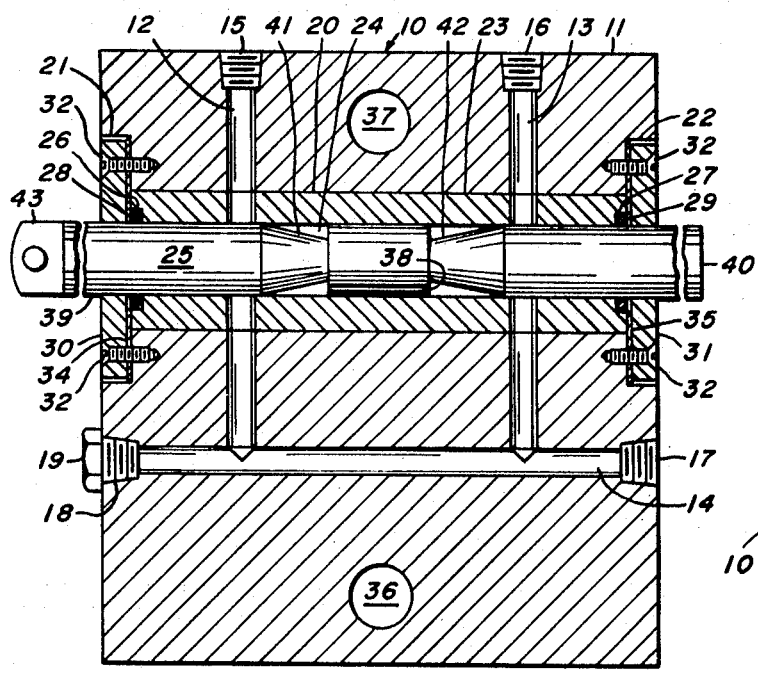
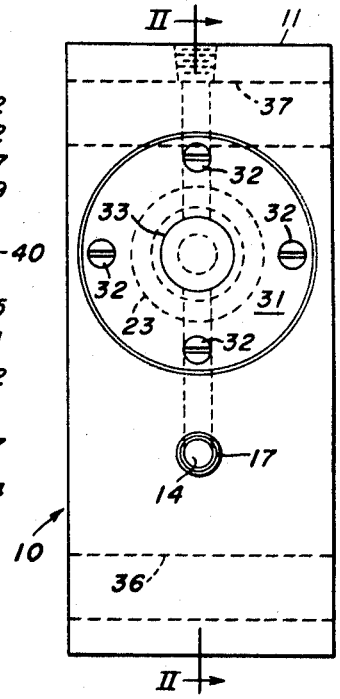
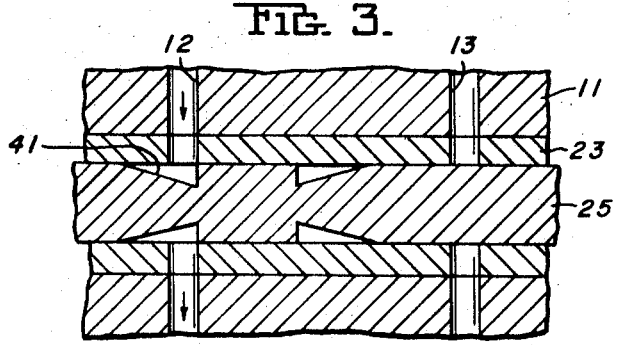
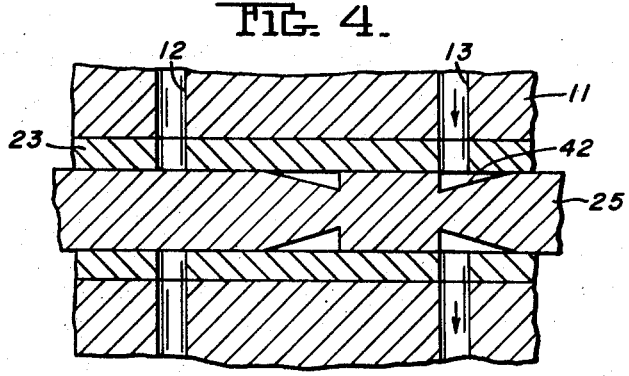
INVENTOR.
LAURENCE H. AUSTIN
BY *(signature)*
Attorney Oct. 7, 1969
L. H. AUSTIN
3,470,908
VARIABLE HYDRAULIC CONTROL DEVICE
Filed Oct. 5, 1966
2 Sheets-Sheet 2
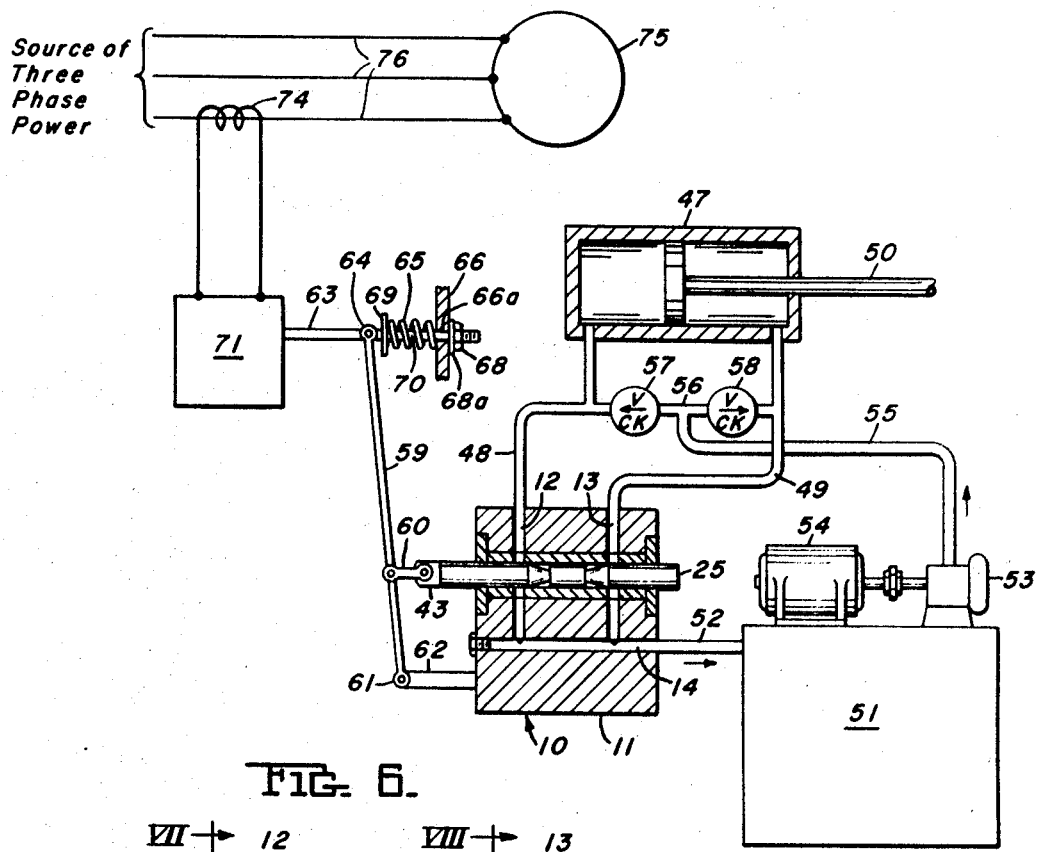
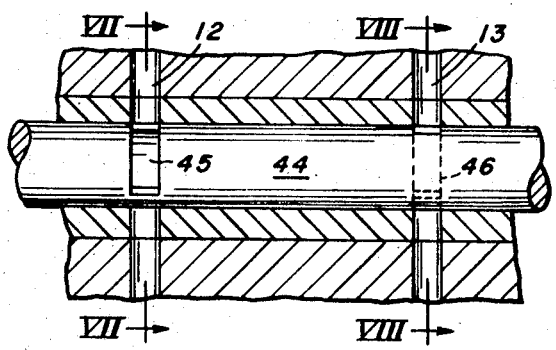
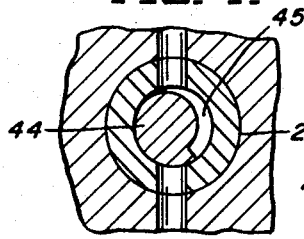
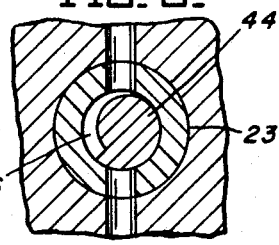
INVENTOR.
LAURENCE H. AUSTIN
BY
Attorney _United States Patent Office_

3,470,908
Patented Oct. 7, 1969

3,470,908
VARIABLE HYDRAULIC CONTROL DEVICE
Laurence H. Austin, 808 Aetna Drive,
Ellwood City, Pa. 16117
Filed Oct. 5, 1966, Ser. No. 584,441
Int. Cl. F16k *11/07*
U.S. Cl. 137—625.4                                     1 Claim

ABSTRACT OF THE DISCLOSURE

This invention relates to a flow-control valve having two fluid passages extending between high-and-low pressure zones and interrupted by a cylindrical bore containing a valve spool with generally frustoconical metering portions inwardly of each end and being adapted to selectively register with the fluid passages upon movement of the valve spool. The valve spool is moved by means external of said valve in a positive and regulated fashion in directions toward and away from positions of fluid flow through the valve.

---

In many control applications, it is desirable to exhaust fluid from two separate fluid chambers. This normally requires a valve for use with each chamber. A substantial savings would of course result in such applications if a single valve could be used to independently meter the flow from each fluid chamber. It is customary in these applications to use solenoid-operated valves wherein the valve spool is either full open or full closed depending upon whether the associated solenoid is energized or deenergized. These valves provide the disadvantages that metering of the fluid is not achieved because the valve is either full open or full closed and that positive solenoid control between open and closed positions causes valve hammering, which severely shortens the service life of the valve.

Therefore, it is a primary object of this invention to provide a valve for independently metering fluid flow through a plurality of fluid passages.

It is a more particular object of this invention to provide a valve that will simultaneously stop fluid through two fluid passages or alternatively meter fluid through either one of the passages while stopping flow through the other.

It is a further object of this invention to provide a unitary valve that can be operated mechanically and thus does not require the use of solenoids.

It is still a further object of this invention to provide a valve that can be operated mechanically and yet in response to an electrical control system.

In accordance with the objects of the invention, there is provided a valve with mutually co-extending fluid passages extending between high- and low-pressure zones and interrupted by a cylindrical bore containing a slidable generally cylindrical shaped spool with generally frustoconical sections inwardly of each end and extending to meet a generally cylindrical center portion of said spool, the frustoconical sections being spaced apart to be selectively registrable with the fluid passages.

A complete understanding of the invention may be had by reference to the following description and to the accompanying drawings wherein:

FIG. 1 is a side elevation of the valve of the instant invention;

FIG. 2 is a partial section taken along the lines II—II of FIG. 1;

FIG. 3 is a partial section of the valve and spool, showing one of the fluid passages in the completely open position;

FIG. 4 is a partial section of the valve and spool, showing the opposite fluid passage in the completely open position;

FIG. 5 is a schematic diagram, parts of which are in section, showing the apparatus of the instant invention used to control the fluid pressure on either side of a closed piston system;

FIG. 6 is a fragmentary section of the valve showing an alternate embodiment of the spool;

FIG. 7 is a section taken along the lines VII—VII of FIG. 6 showing the shape of one of the peripheral recesses in the alternate spool; and FIG. 8 is a section taken along the lines VIII—VIII of FIG. 6 showing the shape of the opposite recess in the alternate spool.

Referring now to the drawings, and in particular to FIGS. 1 and 2, the numeral 10 designates generally the valve of the invention having a valve body 11, which may be made from any suitable material such as steel. Although the shape of the valve body is shown as generally rectangular in cross-section, it may be any other suitable shape and can be made by casting as well as machining. From the top of the valve, as viewed in the drawings, there extend two parallel fluid passages 12 and 13; they intersect at right angles with a common fluid passage 14. Each end of the fluid passages 12, 13 and 14 that opens on the surface of the valve body 11 is provided with an internal thread portion as shown by numerals 15, 16, 17 and 18. Fluid passage 14 extends completely through the valve body 11, because this is the easiest method of fabrication. Since this passage 14 need only be opened on one end 17, for purposes described hereinafter, the opposite end 18 is closed by a suitably threaded plug 19. Parallel to passage 14 and interrupting fluid passages 12 and 13 within the valve body is a large-diameter through bore 20. Larger diameter, shallow depth recesses 21 and 22 are machined in the valve body at the ends of bore 20 and are concentric therewith. Press-fitted inside bore 20 and coextensive therewith is a suitable bushing designated generally by 23. The bushing 23 can be fabricated from any suitable material such as brass. The bushing 23 defines a longitudinal bore 24 of sufficient diameter to slidably engage spool 25. Peripheral recesses 26 and 27 are provided at the ends of the bushing to receive O-ring seals 28 and 29, respectively. The O-ring seals 28 and 29 prevent leakage of hydraulic fluid around the spool.

In the construction of the valve, after the bushing 23 has been press-fitted into the valve body, fluid passages 12 and 13 are extended through the bushing as by drilling. Two O-ring retaining plates 30 and 31 which may be made for example from steel, are secured within recesses 21 and 22, respectively, by screws 32. Plate 30 seats gasket 34, and plate 31 seats gasket 35. Each plate has a center opening 33 through which the ends of spool 25 slidably extend. The valve body 11 may be provided with bores 36 and 37 to facilitate mounting of the valve when in use.

Spool 25 has an inner cylindrical portion 38 and two outer cylindrical sections 39 and 40, which are separated by two frustoconical sections 41 and 42. The length and shape of the frustoconical sections 41 and 42 are such that by sliding the spool axially in the proper direction section 41 may be made to register with passage 12 while passage 13 remains closed, or section 42 may be made to register with passage 13 while passage 12 remains closed. The greater the movement of the spool, the greater will be the quantity of fluid metered through the passage until a full-open position is achieved.

Spool 25 is fabricated with a lug 43 on either end to facilitate suitable mechanical connection with an actuator arm as shown in FIG. 5.

FIGS. 6, 7 and 8 show an alternate embodiment of the spool of the invention. Referring to FIG. 6, the spool 44 is a cylindrical rod having tapered peripheral recesses 45 and 46 communicating with fluid passages 12 and 13, respectively, as shown in FIGS. 7 and 8. These recesses or grooves 45 and 46 extend for one-half the circumference of the spool and are located on opposite halves of the circumference relative to one another. This spool would be used if the valve were to be actuated by rotational movement, rather than axial movement of the spool. This rotational movement could be supplied for example by connecting the spool to the shaft of an electric motor.

An example of the valve of the invention in actual operation is shown schematically in FIG. 5. Fluid passage 12 of the valve 11 is connected to one end of a hydraulic cylinder 47 by means of flexible fluid line 48, and fluid passage 13 is connected to the other end of cylinder 47 by means of flexible fluid line 49. The hydraulic cylinder 47 is fitted with a load piston 50 connected to a frame (not shown) supporting a grinding wheel (not shown) for movement toward and away from the workpiece. Consequently, axial movement of the shaft results in a corresponding positioning of the grinding wheel relative to the workpiece. Fluid passage 14 is connected to a hydraulic fluid reservoir 51 by means of flexible fluid line 52. Hydraulic fluid is supplied from the reservoir 51 to the valve 11 and cylinder 47 through flexible fluid line 55 by means of pump 53, which is operated by electric motor 54. For this purpose fluid line 55 is connected to fluid line 56, which in turn is connected to lines 48 and 49. These two lines lead to cylinder 47 through check valves 57 and 58. The lug 43 on the end of spool 25 is connected to lever 59 by pivot link 60. A lower or fulcrum end 61 of lever 59 is pivotally connected to the valve body 11 as by rigid arm 62. The opposite end of lever 59 is rigidly connected to an actuator arm 63 as at 64. One end of arm 63 is secured to an actuator 71 and the other end to a suitable bearing plate 69 as by bolting or welding. A threaded adjusting shaft 70 is secured to the opposite face of bearing plate 69. A suitable retaining spring 65 is positioned on the adjusting shaft 70 and nests between bearing plate 69 and fixed support 66, which may for example be on the grinding machine frame (not shown). The free end of threaded shaft 70 is passed through a larger diameter opening 66A in fixed support 66 so that the shaft 70 may be moved axially. The end of shaft 70 protruding from opening 66A is maintained in position by nut 68 and washer 68A. This nut and washer assembly permit axial adjustment of valve spool 25 by the axial positioning of shaft 70 and associated lever 59.

The actuator 71 includes a transducer that in the well-known manner converts an electrical signal into a corresponding linear, axial movement of the actuator arm 63. Actuator 71 is electrically connected to a transformer 74, the primary of which is around one of the lead wires 76 supplying the necessary electrical current to grinder motor 75.

In operation of the arrangement of FIG. 5, the pump 53 will be activated by motor 54 causing hydraulic fluid to be pumped from reservoir 51 to fill all the fluid passages 55, 56, 48, 49, 12 and 13, and cylinder 47. Grinding is now begun. When the grinding-wheel pressure increases because of contact with hard spots or the like in the workpiece, this causes a corresponding increase in the current supplied to motor 75 through wires 76. This current increase is detected by the transformer 74 and an electrical signal proportional thereto is introduced to the actuator 71. In response to this signal, the actuator moves the arm 63 to the left (as viewed in FIG. 5); this in turn, through the action of arm 59, moves the valve spool 25 to the left (as viewed in FIG. 5). This causes the frustoconical section 41 of the spool to register with fluid passage 12.

This permits fluid from the left (as viewed in FIG. 5) of load piston 50 to exhaust to the reservoir 51 via 48, 12, 14, and 52. This causes a hydraulic imbalance of the load piston, and it thus moves to the left (as viewed in FIG. 5). This, of course, decreases the grinding-wheel pressure, which in turn decreases the current in wires 76 to the normal level. The actuator then operates to move the arm 63 to the right (as viewed in FIG. 5), which causes the spool 25 to correspondingly move to the right and resume its normal position shown in FIG. 5. In this position, the passage 12 is closed by the spool and fluid is no longer exhausted from the cylinder 47. Consequently, fluid pump from reservoir 51, instead of returning to the reservoir via 48, 12, 14 and 52, enters the cylinder 47 via line 48 to cause the load piston to move to the right (as viewed in FIG. 5) until the normal balanced position is reached. Grinding then continues at normal grinding-wheel pressure.

It will be appreciated that the arrangement as described above and shown in FIG. 5 can operate in the reverse direction to increase the pressure on the grinding wheel.

Uses of the valve other than the specific application described above and shown in FIG. 5 will be apparent to those skilled in the art. For example, the simultaneous regulation of the flow through two separate passageways with only one valve should be advantageous in many applications. To this end, relocation of the frustoconical sections of the spool could be effected to make the valve suitable for a metering operation. In such a metering operation the fluid passages would be open when the spool is centrally located. Movement of the spool in one direction would then effect closing or restriction of one passageway and movement in the opposite direction would effect closing or restriction of the other passageway.

I claim:
1. A flow-control valve comprising, a valve body, first and second fluid passages within said valve body and connecting the same between a high-pressure fluid zone and a low-pressure fluid zone, a cylindrical bore within said valve body and intersecting said passages, a generally cylindrical valve spool slidably disposed within said bore, said valve spool having a pair of opposed frustoconical fluid-metering portions and being adapted to close both said fluid-passages between said high and low-pressure fluid zones when said spool is in a neutral position and to meter fluid to said low-pressure zone through said first passage while maintaining said second passage closed upon movement of said spool in one direction and to meter fluid to said low-pressure zone through said second passage while maintaining said first passage closed by movement of said spool in the opposite direction, mechanical means connected to one end of said valve spool and adapted to impart positive, selective movement of said spool in both directions, said movement being independent of fluid flow through said valve.

References Cited

UNITED STATES PATENTS

| 2,020,773 | 11/1935 | Ernst | 137—625.3 |
| 2,326,487 | 8/1943 | Overbeke | 137—625.18 X |
| 3,128,789 | 4/1964 | Wagner | 137—117 X |
| 3,136,336 | 6/1964 | Priesmeyer | 137—625.18 X |
| 1,972,853 | 9/1934 | Johnson | 251—25 X |

M. CARY NELSON, Primary Examiner

M. O. STRUM, Assistant Examiner

U.S. Cl. X.R.

137—625.42